June 1, 1937.                B. DICK                2,082,244
BRAKE SHOE GUIDE
Filed Dec. 7, 1935
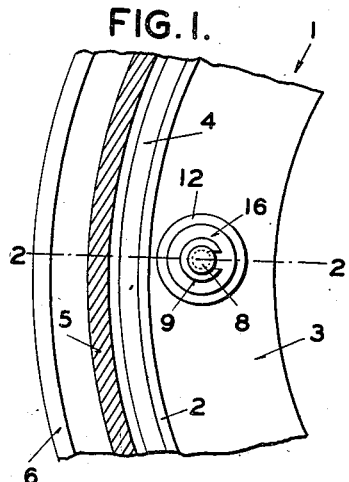
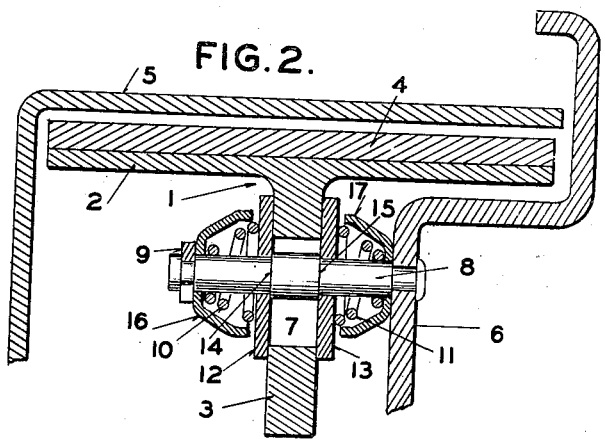
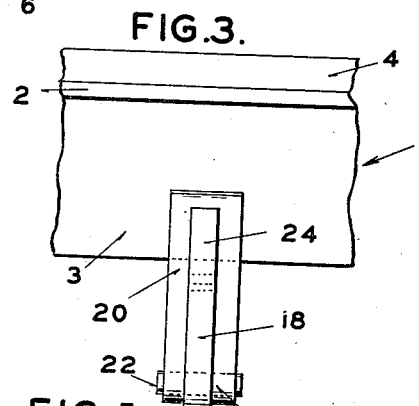
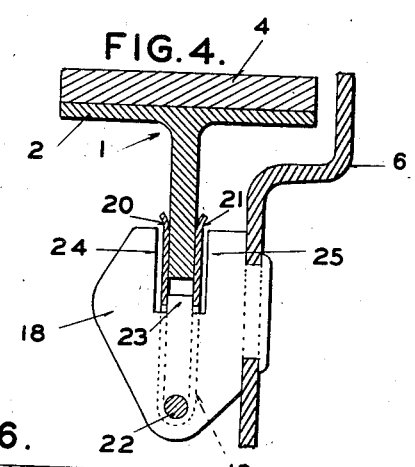
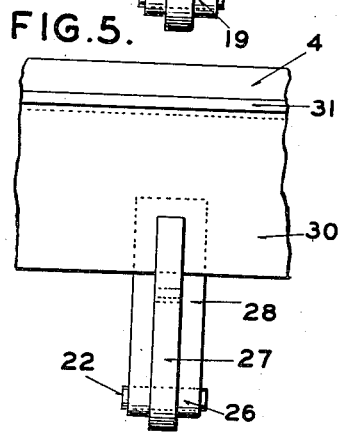
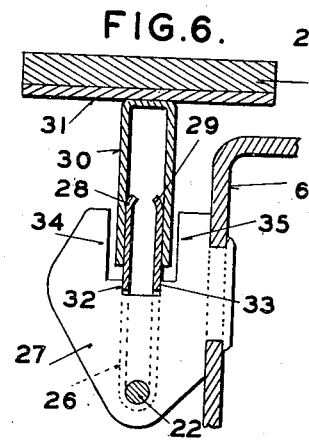
INVENTOR.
BURNS DICK
BY
ATTORNEY.

Patented June 1, 1937

2,082,244

UNITED STATES PATENT OFFICE 2,082,244

BRAKE SHOE GUIDE

Burns Dick, Ferguson, Mo., assignor to Wagner Electric Corporation, St. Louis, Mo., a corporation of Delaware Application December 7, 1935, Serial No. 53,321

8 Claims. (Cl. 188—78)

My invention relates to improvements in yieldable guides for brake shoes, an object of which is to provide a yieldable guide which will insure proper positioning of the brake shoe with respect to its supporting plate and the brake drum when the brake shoe is in disengaged position, and which is so constructed that it will not be damaged as a result of rough handling of the supporting plate and the brake shoe after their assembly.

Other objects of my invention will become apparent from the following description taken in connection with the accompanying drawing in which Figure 1 is a side view of a portion of a brake assembly showing the preferred form of guide construction embodying my invention; Figure 2 is a cross-sectional view on the line 2—2 of Figure 1; Figures 3 and 4 are side and cross-sectional views, respectively, of a modified construction; and Figures 5 and 6 are side and cross-sectional views, respectively, of another modified construction.

Referring in detail to Figures 1 and 2, I have shown a portion of a brake shoe 1 having the usual lining carrying flange 2 and web 3. The flange 2 has mounted thereon a lining 4 which cooperates with the brake drum 5 in a well-known manner. The drum is enclosed by a stationary supporting or backing plate 6 upon which the brake shoe 1 is anchored.

The web of the shoe is provided with an opening 7 through which extends a pin 8 rigidly mounted on the backing plate in the manner shown. The inner end of this pin carries a shoulder 9 in the form of a C-washer removably mounted in a suitable groove adjacent the end of the pin. A coil spring 10 is interposed between the C-washer and one side of the web 3, and a second coil spring 11 is interposed between the backing plate and the other side of the web, the spring 10 acting on the web through a washer 12 and the spring 11 acting on the web through a washer 13, both washers being slidably mounted on the pin. The central portion of the pin is formed with a shoulder 14 forming a stop for the washer 12 and a shoulder 15 forming a stop for the washer 13. These shoulders are spaced apart a distance approximately equal to the thickness of the web, thereby insuring that the springs 10 and 11, regardless of their relative strength, will tend to always act to bring the web to a position determined by the shoulders. Since the washers 12 and 13 are slidably mounted upon the pin, the shoe may move in either direction against the action of one of the springs, the other spring being prevented from acting on the shoe during such movement as a result of its washer engaging a shoulder.

In order to limit the amount of movement of the shoe in either direction, I have provided a pair of cup-shaped stop members 16 and 17 surrounding the spring, the cup member 16 being interposed between the spring 10 and the C-washer 9, and the cup member 17 being interposed between the spring 11 and the backing plate 6. The cup members are equally spaced from the web portion when the shoe is maintained in its central position determined by shoulders 14 and 15.

When the brake shoe is disengaged from the drum it will be free to be properly positioned by the springs 10 and 11. When the shoe is applied to the drum, the springs will not prevent it from tilting if necessary to maintain a complete contact with the drum surface. If, for example, as the result of prolonged application of the brake shoe, the drum should become slightly conical or flared, the brake shoe will be free to tilt on its pivot or pivots so as to assume a position whereby all the lining surface will continue to engage the drum surface. The yieldable guide also permits the shoes to freely tilt to accommodate any uneven brake drum surface. The cup members 16 and 17 are so positioned, with respect to the shoe web, that they do not interfere with the desired tilting of the brake shoe.

In the assembly of brakes after they are manufactured, the shoes are generally mounted upon the backing plate and then shipped as a unit for mounting on a vehicle. During the handling of the assembled shoes and backing plate, and prior to their assembly on a vehicle, it is possible that the brake shoe may be moved sufficiently relatively to the backing plate that the springs 10 and 11 will be damaged, thus resulting in the springs failing to function properly to maintain the shoe in the desired position when the backing plate is mounted on the vehicle. By having the cup members 16 and 17 for limiting the extent of movement of the brake shoe relatively to the backing plate, the possibility of damage to the springs is eliminated. It is thus seen that the yieldable means for the shoe is certain to function properly when the brake is installed on the vehicle and that no checking of this portion of the structure is necessary after the shoes have been initially assembled on the backing plate.

Referring to Figures 3 and 4, I have shown a modified construction in which the yieldable means for guiding and centering the shoe is of the leaf-spring type. The backing plate 6 has secured thereto a guide-supporting member 18 for carrying a U-shaped leaf-spring 19. The legs 20 and 21 of this spring are slotted to receive the supporting member, and the base of the U is secured to the supporting member by a suitable pin 22. The legs 20 and 21 act upon opposite sides of the web 3 of the brake shoe 1 and a projection 23 on the supporting member acts as stop means for insuring that the brake shoe will be properly centered regardless of the relative strength of the legs 20 and 21 of the spring. The projection 23 is of substantially the same width as the thickness of the shoe web. The stops for limiting the amount of movement of the brake shoe comprise projections 24 and 25 extending on opposite sides of the web of the shoe. This modified structure functions in the same manner as the preferred construction shown in Figures 1 and 2.

In Figures 5 and 6, I have shown a structure similar to that of Figures 3 and 4 adapted to be used with a brake shoe in which the web is of U-shaped construction. The U-shaped leaf spring 26 is mounted on the supporting member 27 in a manner similar to that in which the spring 19 is mounted on the supporting member 18 and the legs 28 and 29 thereof cooperate with the inner surfaces of the U-shaped web 30 on the brake shoe 31. The means for insuring that the legs of the leaf-spring will always tend to maintain the brake shoe in a proper position with respect to the backing plate, comprises shoulders 32 and 33 on the supporting member 27, these shoulders being spaced apart a distance equal to the distance between the inner surfaces of the U-shaped web member 30. Projections 34 and 35 positioned on opposite sides of the web, limit the extent of movement of the brake shoe.

From the foregoing description it will be seen that I have produced yieldable guiding means for a brake shoe which will always insure that the brake shoe is properly positioned with respect to the backing plate and the drum when the shoe is in disengaged position, and also one in which there is no possibility of damage being inflicted on the yieldable means by rough handling of the backing plate and shoe assembly before being mounted on a vehicle. In all the devices shown which embody my invention the construction is simple and the cost of manufacture is low.

Having fully described my invention, what I claim as new and desire to secure by Letters Patent of the United States is:

1. In brake shoe construction, a brake shoe, a support for the shoe and guiding means carried by the support for yieldably maintaining the shoe in a predetermined position, said means comprising yieldable members acting in opposite directions on a portion of the brake shoe and means for preventing one of said members from acting on the portion of the shoe when the other member yields under the action of shoe movement, and means for limiting the extent of movement of the shoe, said last named means being fixed with respect to the support and acting on the same portion of the shoe that is acted on by the yieldable members.

2. In brake shoe construction, a brake shoe, a support for the shoe and guiding means carried by the support for yieldably maintaining the shoe in a predetermined position, said means comprising yieldable members acting in opposite directions on a portion of the brake shoe and means for preventing either yieldable member from acting on the shoe when the other yieldable member is flexed by shoe movement, and stop means fixed with respect to the support and positioned adjacent the guiding means for limiting the amount of movement of the shoe in either direction.

3. In brake shoe construction, a brake shoe having a web portion, a backing plate upon which the shoe is mounted, guiding means for the shoe, said means comprising a supporting member secured to the backing plate, yieldable members carried by the supporting member and acting in opposite directions on the shoe web, stop means on the supporting member for preventing either yieldable member from acting on the shoe when the other yieldable member is flexed by shoe movement, and other stop means carried by the supporting member for limiting the amount of movement of the shoe in either direction.

4. In brake shoe construction, a brake shoe having a web portion, a support for the shoe, guiding means for the shoe, said means comprising a member secured to the support, yieldable elements carried by the member and acting in opposite directions on the shoe web, stops carried by the supporting member and positioned on opposite sides of the shoe web for limiting the movement of the shoe in either direction, and means for causing said yieldable elements to normally maintain the shoe web intermediate of, and out of contact with, the stops.

5. In brake shoe construction, a brake shoe having a web portion with an opening therethrough, a backing plate upon which the shoe is mounted, guiding means for the shoe, said means comprising a pin carried by the backing plate and extending through the web opening, two coil springs mounted on the pin and acting in opposite directions on the shoe web, stops carried by the pin and spaced from the shoe web for limiting the movement of the shoe in either direction against the springs, and means on the pin for causing the springs to normally maintain the shoe web intermediate of, and out of contact with, the stops.

6. In brake shoe construction, a brake shoe, a brake shoe support, guiding means for the shoe, said means comprising a pin secured to the support and extending transversely of the shoe, two coiled springs carried by the pin and adapted to act on opposite sides of a portion of the shoe, a washer slidable on the pin and interposed between each spring and the shoe portion, stops carried by the pin and engaged by the washers for preventing either of the springs from acting on the shoe when the shoe moves to flex the other spring, and other stops carried by the pin and spaced from the shoe portion for limiting the amount of movement of the shoe in either direction from its normal position as determined by the springs and the first named stops.

7. In brake shoe construction, a brake shoe having a web portion, a backing plate upon which the shoe is mounted, guiding means for the shoe, said means comprising a supporting member secured to the backing plate, a U-shaped spring member carried by the supporting member and having its legs acting in opposite directions on the shoe web, means on the supporting member for preventing one of said legs of the spring from following the shoe web when the shoe moves and flexes the other leg, and means for limiting the extent of movement of the shoe in either direction.

8. In brake shoe construction, a brake shoe having a web portion, a backing plate upon which the shoe is mounted, guiding means for the shoe, said means comprising a supporting member secured to the backing plate, a U-shaped spring member carried by the supporting member and having its legs acting in opposite directions on the shoe web, stops for limiting the extent of movement of the shoe in either direction, said stops comprising a pair of projections on the supporting member positioned on opposite sides of the shoe web, and means on the supporting member for causing the legs of the spring to normally maintain the shoe web positioned intermediate of, and out of contact with, the stops.

BURNS DICK.